Patented Feb. 8, 1944

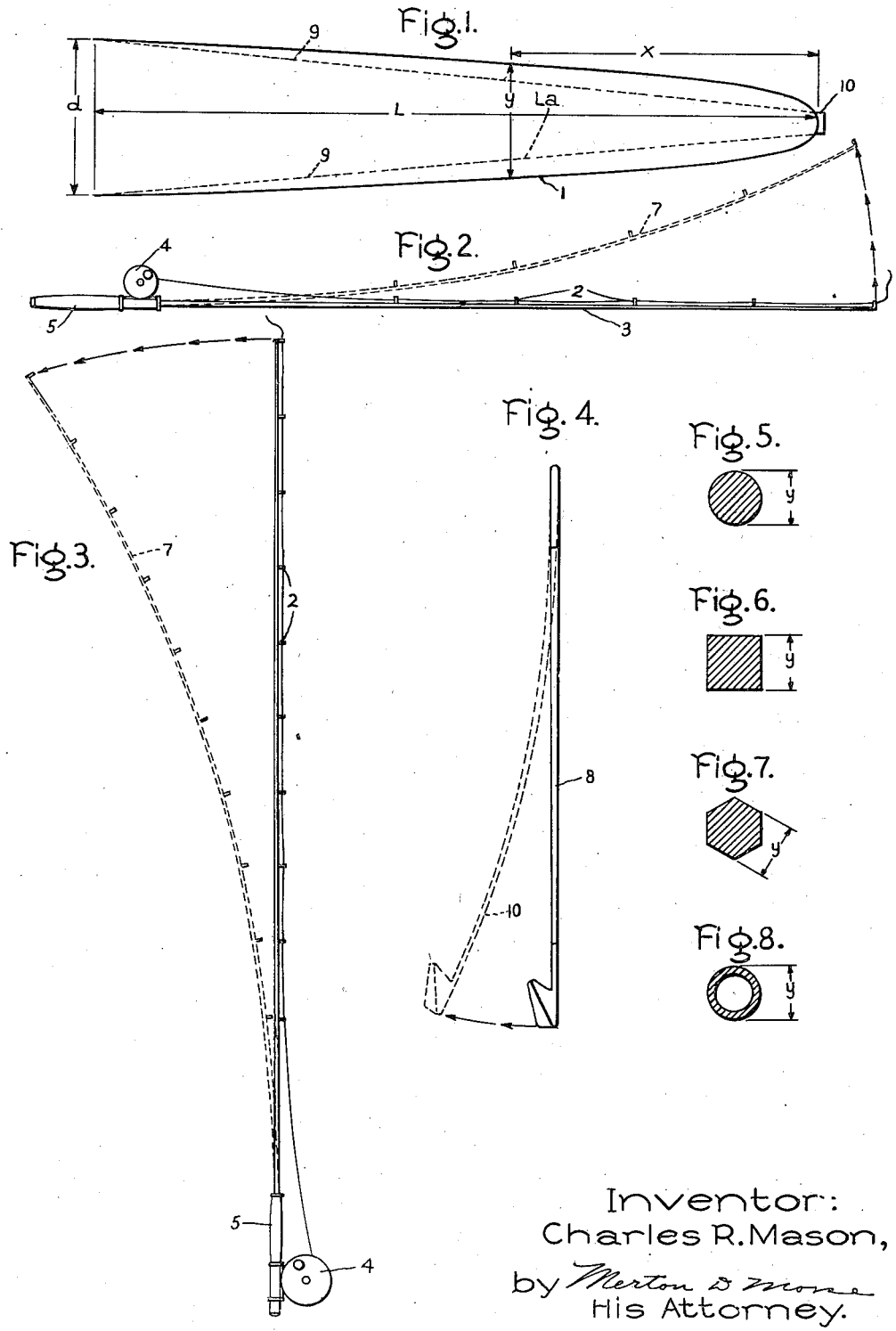

2,341,053

UNITED STATES PATENT OFFICE 2,341,053

FLEXURE MEMBER

Charles R. Mason, Charlton, N. Y., assignor of one-half to Robert B. Ransom, Hartford, Conn.

Application April 24, 1941, Serial No. 390,047

12 Claims. (Cl. 43—18)

My invention relates to flexure members and particularly to that class of flexure members adapted to be flexed by manual manipulation to store energy therein which when released is imparted to an object to be thrown or cast through space.

An object of my invention is to provide such a member which when gripped, or held firm at one point therein and flexed by force applied to another point has uniform bending stress therein throughout the length of the member. In this way the material employed in the member to produce a given resistance to flexure may be materially reduced thereby reducing the weight of the member. In applications to which I contemplate the application of my invention such reduced weight is highly desirable.

My invention has for another of its objects to provide a fishing rod of reduced weight and improved action. Another object of my invention is to secure these results in fishing rods having solid shafts such as rods of the split bamboo type.

The novel features which I believe to be characteristic of my invention are set forth with particularity in the appended claims. My invention itself, however, will best be understood by reference to the following description taken in connection with the accompanying drawing in which Fig. 1 represents, in an exaggerated way, a flexure member embodying my invention, Figs. 2 and 3 represent fishing rods to which my invention may be applied. Fig. 4 represents a golf club to which my invention may be applied and Figs. 5, 6, 7 and 8 represent cross sectional views of any of the devices shown in Figs. 2, 3 and 4.

Referring to Fig. 1 of the drawing I have shown therein a member 1 which may be taken to represent, in an exaggerated way, for the purpose of illustrating the principles involved in my invention, a flexure member which may, in its actual application, comprise the shaft of a fishing rod, for example. It is shown in Fig. 1 with its crosswise dimension greatly exaggerated relative to its length for the purpose of better portraying the principle involved in my invention. This member may be considered to have a length L and a crosswise dimension, or diameter, $d$, at its larger end, and a crosswise dimension, or diameter, $y$, at any point throughout the length thereof. According to my invention the dimension $y$ at any point throughout the length of the member may have the value $$y = d\sqrt[3]{\frac{X}{L}} \qquad (1)$$

where $y$ is the diameter at any point in the length of the member, $d$ is the diameter at the base or larger end, $X$ is the distance of any point from the smaller end of the member, and L is the length of the member.

This formula may be derived from relations well known to the art of strength of materials.

It is well known in the art of strength of materials that a member held firmly at one end and flexed by force applied at the other end at right angles thereto should have a cross sectional dimension $d$ at the base which may be expressed as follows:

$$d = \sqrt[3]{\frac{32\ PL}{\pi s}} \qquad (2)$$

where P represents the applied force, $s$ represents the stress in pounds per square inch to which the material composing the member may be safely subjected, $\pi$ represents the quantity 3.1416, and L and $d$ represent the values above given. It is also known that for maximum utilization of the material of the member, the member should have a shape determined by the following relation:

$$Y = \frac{32P}{\pi s} X \qquad (3)$$

Substituting the value of $$\frac{32P}{\pi s}$$

given by Equation 2 into Equation 3 we obtain the relation given by Equation 1 above.

A member comprised of material homogenous throughout its length and constructed in accordance with this formula, as expressed by Equation 1, possesses the property of most efficiently utilizing the material employed in the member to resist bending under the conditions contemplated. Such a member when held firmly at one point in its length, as for example at the larger end $d$ and flexed by force applied at its opposite end and at right angles to its axis is substantially uniformly stressed in bending at every point in its length. The member therefore bends into the form of an arc of a circle. Since all parts of the member are equally stressed in bending all of the material within the member is utilized to greatest advantage with the result that, to produce a member of given strength, or resistance to flexure, the amount of material employed may be reduced.

I contemplate the use of such a flexure member in the shaft of such devices as fishing rods, for example. While the equations above referred to are derived for the static conditions mentioned, i. e. the condition in which the member is held firmly at one end and subjected to a force applied at the other end it has been found, in accordance with my invention, that fishing rods constructed in accordance with Equation 1 above possess very decided advantages. Fishing rods, of course, are held in the hand at one end and, in casting, are swung by motion of the hand at that point in such manner as to impart desired motion to the line to be cast. This line may extend through guides along the rod and into space from the small end of the rod. It imparts a force to the rod causing bending thereof. It has been found that with rods constructed in accordance with the equation referred to the cast of the line is substantially facilitated. This is true both with respect to relatively short rugged casting rods such as may be used in plug casting, or in surf casting, and in the longer lighter rods such as are used for fly casting, for example.

Figs. 2 and 3 represent fishing rods which may be constructed in accordance with my invention. These rods may comprise a single section or a number of sections, as desired.

Fig. 2 may be taken to represent the class of rod used for plug, or bait, casting, and such as may be used for surf casting; the rod comprising a shaft 3 having a reel 4 mounted thereon between the hand grip 5 and the flexure member comprising the shaft 3.

Fig. 3 may be taken to represent a lighter casting rod such as may be used for fly casting, comprising a somewhat longer more slender flexure member, or shaft, and having a reel 4 mounted upon its end beyond the grip 5.

In both Fig. 2 and Fig. 3 the rod is provided with a number of guides 2 through which pass the line to be cast. The guides are shown spaced at uniform intervals along the rod. In this way the force applied to the rod through the guides during the casting stroke may be uniformly distributed along the rod. Any other desired spacing of the guides may, of course, be employed.

Both Figs. 2 and 3 show by dotted lines at 7 the form which the flexure member takes when it is flexed by force applied at its small end, as for example, the force which is applied to the rod during the initial part of the forward motion of the casting stroke when the force of the line being drawn through the air bends the rod backward. It will be observed that in each case the rod is bent in the form of an arc of a circle.

It has been found that with rods such as those shown in Figs. 2 and 3 in which the flexure member is proportioned in accordance with my invention as explained in connection with Fig. 1 and having therein a given amount of material, the energy imparted to the line during the casting stroke is substantially increased thereby materially facilitating the cast and increasing the distance from the fisherman at which the lure strikes the surface of the water over which it is cast. These properties are sufficiently pronounced as to produce a definite reduction of fatigue of the fisherman after a period of casting. In fact it has been found that one who has used such a rod for a considerable period of time finds the more conventional rod to be difficult of use and comparatively unsatisfactory in its action. This is true even when contrasted with high grade split bamboo rods.

One advantage obtained from a fishing rod constructed in accordance with my invention results directly from the fact that the rod, during the casting stroke bends, in the form of an arc of a circle extending the whole length of the rod. That is the bending is equally distributed throughout the length of the rod rather than taking place largely in the smaller end of the rod. This means that the effective length of the rod is increased during the casting stroke over what it would be if the bending were concentrated largely in the outer section, or sections, of the rod. This is readily apparent from Figs. 2 and 3 in which it will be seen that the distance of the small end of the rod from hand grip 5 is about the same whether the rod be flexed or not. This increased length increases the extent to which the force applied to the rod by the fisherman in casting is multiplied in being applied to the line. In addition, because of this greater length the line is higher off the ground, which, particularly in fly rods, is of considerable advantage in that it reduces the likelihood of the lure striking objects on the ground, or striking the water, in back of the fisherman on the backward stroke. This facilitates the placement of the lure and in addition, by enabling the fisherman to use a longer freer stroke increases the distance he obtains.

Usually fishing rods, particularly those of the solid type, such as the split bamboo rod, have been constructed with a taper extending from end to end. Such taper may vary in different rods, and at different points in the same rod. Usually, however, the taper is such that a longitudinal cross section of the rod on a line through the axis has side lines which are either straight, such as those indicated at 9 in Fig. 1, or are concave, or curved inward with respect to lines 9. Metallic rods of the tubular type are of nearly the same construction although the taper in such rods may be greater, to some extent, nearer the small end of the rod. Such rods, however, with such taper do not usual vary to any great extent from the straight line taper as indicated by the lines 9 of Fig. 1.

The departure of my present invention from such rods is well portrayed by the comparison of the solid lines of Fig. 1 with the dotted lines 9 thereof. It will be seen that the taper increases at a progressively increasing rate from the larger end to the smaller end and that the diameter beginning at the small end, as at the point 10, where the usual terminal fitting is applied, increases, and attains half of the diameter of the larger end within a few inches of the point 10. It will also be noticed that the larger half of the length of the rod has nearly a straight line taper and that the diameter at the midpoint is about three quarters that at the larger end. Of course the extent to which my invention may be utilized may vary in different rods but generally the diameter at a point one quarter of the length of the rod from the small end should be at least half of the diameter at the large end. A rod constructed in accordance with my invention with progressively increasing taper from the large end to the small end and having a diameter one-quarter of the length from the small end equal to half of its base diameter, as previously mentioned, would have a diameter at its midpoint of at least seventy per cent of the base diameter and at two-thirds of the length from the small end of at least eighty-two percent of its base diameter.

In Fig. 4 I have shown conventionally a golf club having a shaft 8 which may be proportioned in accordance with my invention and which when flexed as during the stroke when hitting a ball bends into the arc of a circle as indicated, in an exaggerated way, by the dotted lines 10. With the shaft provided with a given amount of material and proportioned in accordance with my invention the maximum force is imparted to the ball thereby increasing the distance to which the ball is driven through space.

My invention of course is not limited to fishing tackle or golf clubs but may be employed in other flexure members of the long slender type adapted for manual manipulation to have energy stored therein which when released is imparted to an object to be thrown through space. It may be found useful for example in the design of archer's bows.

The flexure members constructed in accordance with my invention may have any desired cross sectional pattern such as the circle shown in Fig. 5, the square shown in Fig. 6, or the hexagon shown in Fig. 7.

While I contemplate my invention particularly for use in solid members, as for example in a split bamboo fishing rod, it may be employed in tubular members as well. Of course, in tubular members, such as fishing rods, the rate of taper and also the thickness of the wall of the tube may vary from end to end of the rod in such a way as to secure the results obtained by my invention. That is, in such rods the external diameter of the rod may not necessarily satisfy the law, or formula, above expressed, the thickness of the wall being varied sufficiently to produce the uniform bending stress at all points in the rod and to cause the rod on being flexed to assume the form of an arc of a circle. Where the wall thickness is uniform throughout the length of the rod the results of my invention are in large measure, secured when the external diameter varies along the length in accordance with the formula above given. In addition the use of such uniform wall thickness may considerably facilitate the manufacture of the rod.

In Fig. 8 I have illustrated the cross section of a tubular rod.

While I have shown particular forms of my invention it will be understood that this is by way of illustrating the principle involved and certain of its applications and that various modifications may be made both in the structures illustrated and in their form, dimensions and application without departing from the true spirit of my invention. I contemplate by the appended claims to cover any such modification as falls within the true spirit and scope of my invention.

I claim:

1. A fishing rod tapered from one end to the other thereof and having a cross sectional dimention varying from point to point along its length according to the cube root of the ratio of the distance of the respective point from the small end of the rod to the length of said rod.

2. A fishing rod comprising a member tapered from one end to the other thereof, the rate of said taper increasing at a progressively increasing rate from the large end to the small end, said member having a cross sectional dimension at a point within one quarter of the length of the member from the small end at least half the cross sectional dimension at its larger end.

3. A fishing rod of solid material tapered from one end to the other thereof, the boundaries of a longitudinal cross section thereof being convex with diminishing radius of curvature toward the smaller end of the rod.

4. A flexure member for use in the shaft of fishing tackle, said member having a length great as compared with its cross sectional dimension at any point and having a taper extending from one end to the other, the material comprising said member being so distributed throughout said member that said member has uniform bending stress at all points in said member when said member is flexed by force applied at one end thereof transverse to the axis of said member and said member bends substantially in the form of an arc of a circle.

5. A long slender flexure member adapted when flexed by manual manipulation to have energy stored therein which when released is imparted to an object to be hurled through space, said member being tapered from one end adapted to be gripped by the manipulator to the other according to the law $$y = d\sqrt[3]{\frac{x}{L}}$$

where $y$ is the diameter at any point along the length of the member; $x$ is the distance of said point from the smaller end of said member, $L$ is the length of the member, and $d$ is the diameter of said member at the end gripped by the manipulator.

6. A casting rod having a taper extending from one end to the other thereof, the rate of taper changing along the length of the rod in such a way that the rod during the casting stroke bends substantially in the form of an arc of a circle extending throughout its length.

7. A long slender flexure member adapted when flexed by manual manipulation to have energy stored therein which when released is imparted to a structure adapted to be secured to the end thereof to transmit said stored energy to an object to be hurled through space, said member being of solid material and tapered from one end to the other, the rate of said taper increasing at a progressively increasing rate from the larger end to the small end.

8. A long slender flexure member adapted when flexed by manual manipulation to have energy stored therein which when released is imparted to a structure adapted to be secured to the end thereof to transmit said stored energy to an object to be hurled through space, said member being tapered from one end to the other thereof, the rate of said taper increasing from the large end to the smaller end, said member having a cross sectional dimension at a point within one quarter of the length from the small end at least half the cross sectional dimension at its larger end.

9. A long slender hollow flexure member having a uniform wall thickness throughout the length thereof and having a taper from the larger end to the smaller, said taper being at such a rate that a longitudinal cross section of said member has convex lengthwise boundaries with diminishing radius of curvature toward the smaller end.

10. A long hollow flexure member adapted when flexed by force applied manually at one end thereof to have energy stored therein which when released is imparted to a structure adapted to be secured to the opposite end thereof to transmit said stored energy to an object to be hurled through space, the wall thickness of said member varying along the length of the member in such a way that said member bends substantially in the form of an arc of a circle extending from said one end to its other end under force applied at said one end thereof.

11. A fishing rod of solid material from center to surface and tapered from one end to the other thereof, the rate of said taper increasing from the larger end to the smaller end as the cube root of the ratio of the distance of any point on the rod from the smaller end to the length of the rod.

12. A fishing rod tapered from one end to the other thereof and having a diameter at points one-third, one-half and three-quarters of the length from the large end thereof at least eighty-two percent, seventy per cent, and fifty per cent, respectively of the diameter at said larger end.

CHARLES R. MASON.